No. 621,323. Patented Mar. 21, 1899.
A. P. CHAMBERLIN.
GAME CARDS FOR TEACHING MUSIC.
(Application filed Jan. 28, 1899.)
(No Model.)
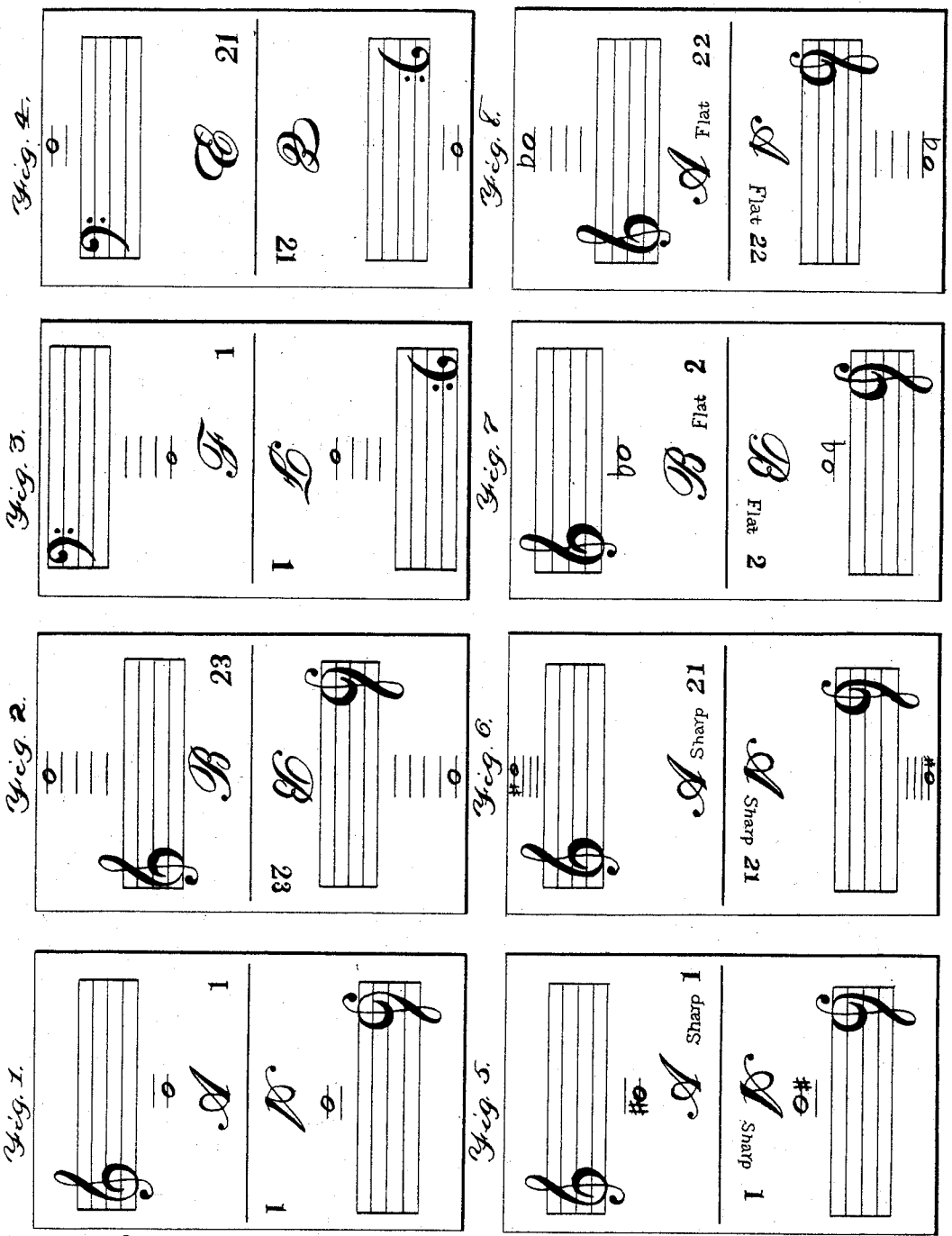

UNITED STATES PATENT OFFICE.

AUGUSTA P. CHAMBERLIN, OF DES MOINES, IOWA.

GAME-CARDS FOR TEACHING MUSIC.

SPECIFICATION forming part of Letters Patent No. 621,323, dated March 21, 1899.

Application filed January 28, 1899. Serial No. 703,672. (No model.)

*To all whom it may concern:*

Be it known that I, AUGUSTA P. CHAMBERLIN, a citizen of the United States of America, residing at Des Moines, in the county of Polk and State of Iowa, have invented Game-Cards for Teaching Music, of which the following is a specification.

Heretofore game-cards have been adapted to familiarize the players with the names and faces of noted authors, to teach natural history by means of pictures of animals on the cards, and to cause exercise in mental arithmetic, and thus impart useful knowledge and afford pleasing entertainment to all who participate in handling the cards as required in playing games therewith.

My object is to provide game-cards specially adapted for imparting instruction in music at the same time that they are used for the purpose of amusement.

My invention consists of a pack of cards divided into series, suits, or books and each such subdivision made illustrative by the lines, symbols, and characters that constitute the rudiments of the science of music and that are indispensable in teaching the art and practicing the art vocally and by means of musical instruments; and my invention is hereinafter more fully set forth, pointed out in my claims, and illustrated in the accompanying drawings, in which—

Figure 1 is a picture of one of my cards and represents the lowest treble-note in a musical scale. Fig. 2 represents the highest note in the subdivision that contains forty-six cards bearing the treble character-marks on each end of each card. Figs. 3 and 4 show the first and last of a series of forty-two cards that contain the symbols and characters of bass-notes. Figs. 5 and 6 show the first and last cards in a series of fifteen cards that are distinguished from all the other cards in the pack by the character expressive of the word "sharp." Figs. 7 and 8 are the representatives of the fifteen cards that are marked with the character that designates them as "flat" cards.

First. The series of treble-note cards consists of, first, forty-six cards, two of a kind, with letter and number on each end, the same making twenty-three of one kind, each differing from the other, the lowest note in treble being A (1) on the second added line below and the highest note being B (23) on the fifth added line above. This series includes the notes of the natural scale from the A (1) on the second added line below to the B (23) on the fifth added line above.

Second. The series of bass-note cards consists of forty-two cards, two of a kind, twenty-one of a kind each differing from the other and commencing with F (1) on the fourth added line below and also the natural notes of the bass up to and including E (21) on the second added line above in bass.

Third. In the series of cards illustrated by Figs. 5 and 6 are fifteen sharp-cards for the treble-notes, each differing from the other, A-sharp (1) on second added line below being the lowest sharp and G-sharp (21) on fourth added line above the highest sharp; also the intermediate thirteen sharps from A-sharp (1) to G-sharp (21) on the fourth added line above. These corresponding in number with the natural notes, they are to take the place of sharps, as do also the flats.

Fourth. Figs. 7 and 8 illustrate the series that have the character-mark termed "flat." There are fifteen of these flat-cards for the treble-notes, each differing from the other, B-flat (2) below the first added line being the lowest flat note, and A-flat (22) above the fourth added line being the highest flat card or note; also the intermediate thirteen flats from B-flat (2) below first added line to A-flat (22) above the fourth added line.

The treble and bass notes represented by Figs. 1, 2, 3, and 4 are to be used for playing a game therewith in the manner the game of "Authors" is played, two cards forming a book.

Another game, designated as "Also," that may be played therewith is to separate the cards and have one of a kind of the treble and bass notes, using only the natural notes or natural notes and flats or natural notes and sharps. Deal off five or more cards to each person. First player put down lowest card he holds face up. Others the same. Party having played highest card wins the game.

For scale-building use the treble-naturals, one of a kind, and the sharps or the flats represented by Figs. 6 and 7 and 7 and 8, according to the scale to be built. One or more persons can participate in building scales. Deal off equally the cards in treble to be used for scales to each person. The person holding the card that denotes the first note of scale lays it down. Next player puts down one or as many as he holds. Next the same, A (1) on second added line below in treble being the lowest note in treble. All scales commence on the first note or notes above that. Commence scales on key-note and use sharps or flats according to directions designed to be printed and inclosed with each pack of one hundred and eighteen cards subdivided into series, as hereinbefore set forth.

Having thus described my invention, its purposes and manner of use, the utility thereof will be obvious to persons familiar with the science and art to which it pertains.

It is also obvious that children and others ignorant of the rudiments of a musical education cannot be taught to play games of different kinds with my musically-characterized cards without becoming familiar with the musical terms and distinctive symbols and marks that are used in composing music and that must be understood by a person in order to be qualified to read or practice or compose music.

What I claim as new, and desire to secure by Letters Patent therefor, is—

1. In a pack of game-cards, a book or series of cards each having thereon the distinguishing musical character or mark known as the "treble-clef" in combination with a musical staff, for the purposes stated.

2. In a pack of game-cards, a book or series of cards each having thereon the distinguishing musical character or mark known as the "bass-clef" in combination with a musical staff for the purposes stated.

3. In a pack of game-cards, a series or plurality of cards each having the character-mark of the "treble-clef," the staff and one pair of the number marked A, another pair B and so on in pairs as required to produce a scale extending from A to G, for the purposes stated.

4. In a pack of cards, a book or series of cards each having the musical mark or character known as the "bass-clef," and a staff and pairs of the series respectively bearing the letters of the alphabet that compose a musical scale as and for the purposes stated.

5. In a pack of game-cards, a series or plurality of cards each having the character-mark of the "treble-clef," the staff and one pair of the number marked A, another pair B and so on in pairs as required to produce a scale extending from A to G, and each card in the series provided also with character or mark known in music as a "flat," for the purposes stated.

6. In a pack of game-cards, a series or plurality of cards each having the character-mark of the "treble-clef," the staff and one pair of the number marked A, another pair B and so on in pairs as required to produce a scale extending from A to G and each card in the series provided with the character or mark that is expressive of the word and musical term of "sharp," for the purposes stated.

7. A pack of game-cards comprising a subdivision or series of cards each of which has the distinguishing mark or character known as the "treble-clef," a second series in which each card has the distinguishing mark or character known as the "bass-clef," a third series in which each card has the distinguishing mark or character known as a "flat" and a fourth series in which each card has the distinguishing mark or character known as a "sharp," and all of the cards in the complete pack provided with staff-lines, letters for designating a scale, and notes and numerals as set forth for the purposes stated.

AUGUSTA P. CHAMBERLIN.

Witnesses:
R. H. ORWIG,
THOMAS G. ORWIG.